United States Patent
Horimai

(10) Patent No.: US 8,459,801 B2
(45) Date of Patent: Jun. 11, 2013

(54) THREE-DIMENSIONAL IMAGE PROJECTOR WITH A PROJECTION IMAGE FORMING DISC WITH A HOLOGRAM RECORDING MEDIUM FORMED ALONG A DISC-SHAPED GLASS SUBSTRATE

(75) Inventor: Hideyoshi Horimai, Numazu (JP)

(73) Assignee: Holymine Corporation, Kanagawa (JP)

( * ) Notice: Subject to any disclaimer, the term of this patent is extended or adjusted under 35 U.S.C. 154(b) by 299 days.

(21) Appl. No.: 12/922,020

(22) PCT Filed: Mar. 12, 2009

(86) PCT No.: PCT/JP2009/054776
§ 371 (c)(1),
(2), (4) Date: Nov. 2, 2010

(87) PCT Pub. No.: WO2009/113618
PCT Pub. Date: Sep. 17, 2009

(65) Prior Publication Data
US 2011/0043877 A1    Feb. 24, 2011

(30) Foreign Application Priority Data
Mar. 13, 2008    (JP) .................. 2008-064483

(51) Int. Cl.
G03B 21/00    (2006.01)
G03B 21/28    (2006.01)
G02B 27/22    (2006.01)
G02B 5/32    (2006.01)
G03H 1/08    (2006.01)
H04N 13/04    (2006.01)

(52) U.S. Cl.
USPC ................. 353/40; 353/10; 353/98; 352/86; 359/478; 359/9; 359/15; 348/51

(58) Field of Classification Search
USPC .................. 353/40, 10, 98; 352/86; 359/478, 359/9, 15; 348/42, 51
See application file for complete search history.

(56) References Cited

U.S. PATENT DOCUMENTS 3,940,202 A * 2/1976 Kato et al. ............... 359/18
6,057,878 A * 5/2000 Ogiwara et al. ........... 348/56

FOREIGN PATENT DOCUMENTS

GB    2182820 A  *  5/1987
JP    48-75045      10/1973

(Continued)

OTHER PUBLICATIONS

Office Action issued by Japanese Patent Office in Japanese Application No. 2008-064483 dated Mar. 12, 2013.

Primary Examiner — Georgia Y Epps
Assistant Examiner — Magda Cruz
(74) Attorney, Agent, or Firm — Sughrue Mion, PLLC

(57) ABSTRACT

An object of the present invention is to display a highly reproducible three-dimensional image in response to changes in the viewer's position and to easily realize the miniaturization of the system. The three-dimensional image projector includes a projection image forming disc in which a hologram recording medium is formed along a disc-shaped glass substrate, and which projects image light having directivity by causing the image light to fall incident on the hologram recording medium, and a rotational drive unit for rotationally driving the projection image forming disc along a surface of the glass substrate with the center point on the surface as a rotation center. The projection image forming disc is preliminarily recorded with a hologram by causing two laser beams as reference light and object light to simultaneously fall incident on the hologram recording medium.

5 Claims, 10 Drawing Sheets

| | FOREIGN PATENT DOCUMENTS | | | | |
|---|---|---|---|---|---|
| JP | 62-127709 A | 6/1987 | JP | 7-193841 A | 7/1995 |
| JP | 2-14697 A | 1/1990 | JP | 9-197581 A | 7/1997 |
| JP | 2-157718 A | 6/1990 | JP | 2007-17634 A | 1/2007 |
| JP | 03-081718 A | 4/1991 | | | |

* cited by examiner (a)

(b)

THREE-DIMENSIONAL IMAGE PROJECTOR WITH A PROJECTION IMAGE FORMING DISC WITH A HOLOGRAM RECORDING MEDIUM FORMED ALONG A DISC-SHAPED GLASS SUBSTRATE

CROSS REFERENCE TO RELATED APPLICATIONS

This application is a National Stage of International Application No. PCT/JP2009/054776 filed Mar. 12, 2009, claiming priority based on Japanese Patent Application No. 2008-064483 filed Mar. 13, 2008, the contents of all of which are incorporated herein by reference in their entirety.

TECHNICAL FIELD

The present invention relates to a three-dimensional image projector which projects a three-dimensional image by causing image light having directivity to fall incident from outside.

BACKGROUND ART

Conventionally, the development of image display systems capable of displaying a three-dimensional image of an object in space has been actively conducted in order to display highly realistic images. As an example of this kind of system, known is a three-dimensional image display device for forming a three-dimensional image by rearranging the respective pixels of a directivity image and forming a composite image, and displaying such composite image using a liquid crystal display and a lenticular sheet, and a three-dimensional image display device for displaying a three-dimensional image by projecting images generated by a plurality of image generating means on a display unit including a reflection mechanism (refer to Patent Literature 1 and Patent Literature 2 below).

CITATION LIST

Patent Literature

Patent Literature 1: Japanese Patent Application Laid-open No. 2007-17634
Patent Literature 2: Japanese Patent Application Laid-open No. H9-197581

Nevertheless, with the device described in Patent Literature 1, since pixels with a plurality of directivities are arranged on a display, the resolution of the three-dimensional image tends to deteriorate if such three-dimensional image is to be displayed in response to changes in the viewer's position. Moreover, with the device described in Patent Literature 2, in order to reproduce a three-dimensional image according to the position of the viewer observing the three-dimensional image, there is a problem in that the size of the system needs to be enlarged since numerous image generating means must be prepared in advance.

SUMMARY OF INVENTION

Technical Problem

The present invention was devised in view of the foregoing problems. Thus, an object of this invention is to provide a three-dimensional image projector capable of displaying a highly reproducible three-dimensional image in response to changes in the viewer's position and easily realizing the miniaturization of the system.

Solution to Problem

In order to achieve the foregoing object, the three-dimensional image projector of the present invention is characterized in comprising a projection image formation unit in which a hologram recording medium is formed along a tabular substrate, and which projects image light having directivity by causing the image light to fall incident on the hologram recording medium, and a drive unit for rotationally driving the projection image formation unit along a surface of the substrate with a predetermined point on the surface as a rotation center, wherein the projection image formation unit is preliminarily recorded with a hologram by causing two laser beams as reference light and object light to simultaneously fall incident on the hologram recording medium.

According to this kind of three-dimensional image projector, since a hologram is preliminarily recorded along the tabular substrate of the projection image formation unit, the image will be intermittently projected in a projecting direction that is decided based on the incident direction of the object light upon recording the hologram as a result of causing image light having directivity to fall incident toward the projection image formation unit while rotating the projection image formation unit with a predetermined point on the surface of the substrate as the rotation center. Consequently, since the image can be projected in a direction that was predetermined during the recording of the hologram only by using an image generating device having predetermined directivity, it is possible to display a highly reproducible three-dimensional image even if the viewer's position is changed. In addition, it is also possible to easily miniaturize the size of the system.

Advantageous Effects of Invention

According to the present invention, it is possible to display a highly reproducible three-dimensional image in response to changes in the viewer's position and easily realize the miniaturization of the system.

DESCRIPTION OF EMBODIMENTS

Figure 1:
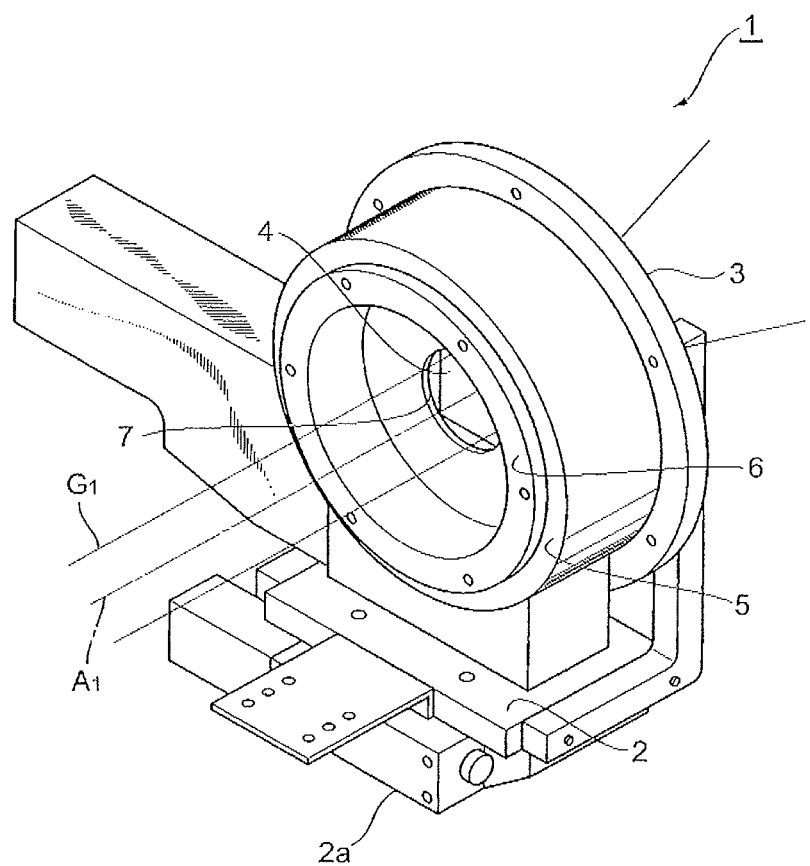
FIG. 1 is a perspective view of the three-dimensional image projector 1 according to the first embodiment of the present invention.

A preferred embodiment of the three-dimensional image projector according to the present invention is now explained in detail with reference to the attached drawings. Note that the same reference numeral is given to the same or corresponding components in the explanation of the drawings, and any redundant explanation is omitted.

First Embodiment

FIG. 1 is a perspective view of the three-dimensional image projector 1 according to the first embodiment of the present invention. The three-dimensional image projector 1 is a device for projecting a three-dimensional image by causing image light having directivity, which fell incident from outside, to be transmitted therethrough, and comprises a rotational drive unit 3 fixed on a pedestal 2, and a projection image forming disc (projection image formation unit) 4 supported by the rotational drive unit 3.

The rotational drive unit 3 includes an outer cylinder 5 and an inner cylinder 6 disposed so that its center axis $A_1$ is approximately parallel to a mounting surface 2a of the pedestal 2, and the inner cylinder 6 is mounted rotatably along an inner surface of the outer cylinder 5. The rotational drive unit 3 has a built-in rotational drive mechanism not shown for rotating the inner cylinder 6 around its center axis $A_1$ at an intended angular velocity based on the supply of power from outside. This kind of rotational drive mechanism can be realized with an electric motor, and a belt drive, a gear and the like.

Moreover, a rectangular opening 7 that is approximately perpendicular to the center axis $A_1$ is provided to the inner central part of the inner cylinder 6, and the disc-shaped projection image forming disc 4 is supported on the inner center axis $A_1$ of the inner cylinder 6 so as to cover the opening 7. The projection image forming disc 4 is disposed so that the center axis $A_1$ of the inner cylinder 6 penetrates the center of its surface in a perpendicular direction.

Figure 2:
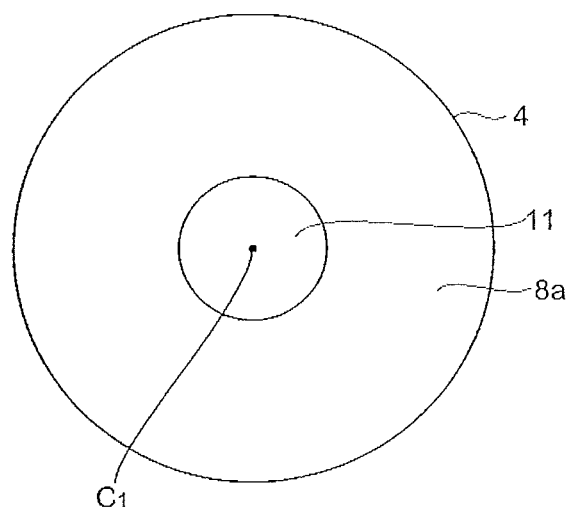
FIG. 2 is a plan view and a side view of the projection image forming disc of FIG. 1.
Figure 2:
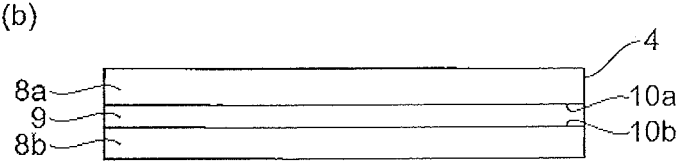

FIGS. 2(a) and 2(b) are a plan view and a side view of the projection image forming disc 4, respectively. As shown in FIGS. 2(a) and 2(b), the projection image forming disc 4 is structured by a hologram recording medium 9, which has the same shape as glass substrates 8a, 8b, being bonded between two disc-shaped light permeable glass substrates 8a, 8b. Specifically, the hologram recording medium 9 is formed along the entire surface of the inner surfaces 10a, 10b of the glass substrates 8a, 8b. As the material of the hologram recording medium 9, for example, photopolymer is used. Moreover, although there is no particular limitation on the thickness of the glass substrates 8a, 8b and the hologram recording medium 9, for example, the thickness is set to 1.2 mm and 0.2 to 0.4 mm, respectively. A circular hologram 11 is preliminarily recorded at the central part of the hologram recording medium 9 based on the formation method described later. According to this kind of configuration, when the projection image forming disc 4 is set on the rotational drive unit 3, the projection image forming disc 4 rotates along the surface of the glass substrate 8a with the center point $C_1$, which is positioned within a formation area of the hologram 11, as the rotation center based on the rotational drive of the rotational drive unit 3.

The method of recording the hologram 11 of the projection image forming disc 4 is now explained.

Figure 3:
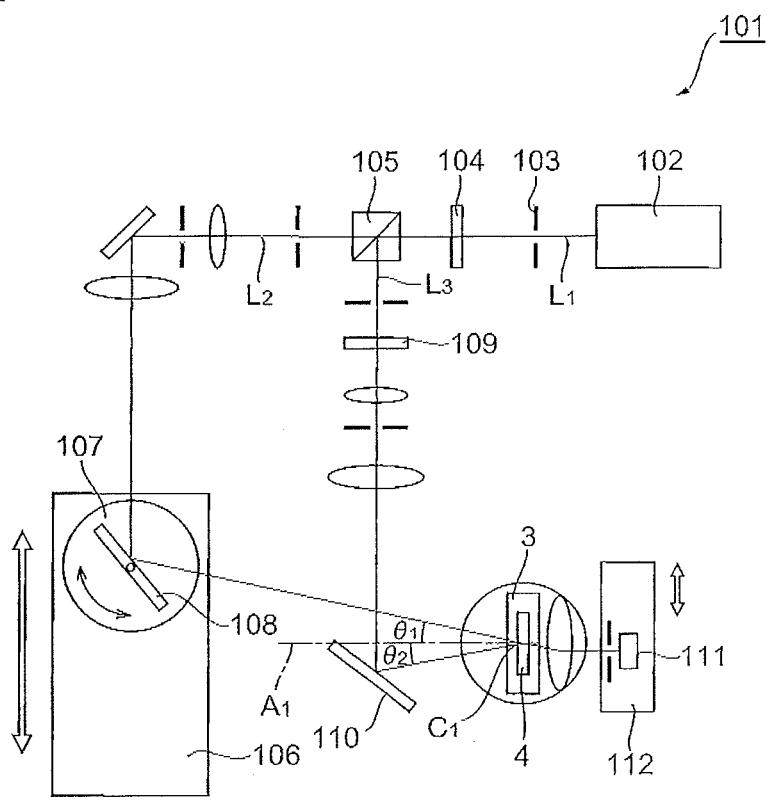
FIG. 3 is a schematic configuration diagram of the hologram recording system to be used for recording the hologram of FIG. 2.

FIG. 3 is a schematic configuration diagram of the hologram recording system 101 that is used for recording the hologram 11. With the hologram recording system 101, a laser beam $L_1$ with a predetermined wavelength of, for example, 532 nm is output from a laser beam source 102, and the laser beam $L_1$ passes through a shutter 103, and is thereafter transmitted through a half wavelength plate 104 that rotates around an optical axis of the laser beam $L_1$. As a result of the laser beam $L_1$, in which its polarizing direction has been changed in various angles, falling incident on the polarizing beam splitter 105, parallel light $L_2$ of a P wave component and a parallel light $L_3$ of an S wave component are divided into two from the laser beam $L_1$ toward an optical paths that are approximately perpendicular to each other.

The parallel light $L_2$ produced as described above is reflected with a mirror 108 mounted on an X axis stage 106 sliding along a horizontal plane and on a rotating stage 107 rotating along a horizontal plane, and thereby falls incident toward the projection image forming disc 4 disposed at a predetermined position at an intended angle along the horizontal plane. Meanwhile, the parallel light $L_3$ is transmitted through the half wavelength plate 104 rotating around the optical axis of the parallel light $L_3$ and thereafter reflected with a mirror 110, and, after its polarizing direction is changed variously, falls incident toward the projection image forming disc 4 disposed at a predetermined position. Here, the parallel light $L_3$ that falls incident on the projection image forming disc 4 is used as reference light for recording the hologram 11, and the parallel light $L_2$ is used as object light for recording the hologram 11.

With this hologram recording system 101, in a state where the projection image forming disc 4 is mounted on the rotational drive unit 3, its center point $C_1$ is positioned roughly on the optical axis of the parallel light $L_3$, and the optical axis of the parallel light L3 is disposed to slant approximately at an angle $\theta_2$ relative to the surface of the glass substrate 8a. Simultaneously, the X axis stage 106 and the rotating stage 107 are controlled so that the optical axis of the parallel light $L_2$ constantly passes through the center point $C_1$ of the projection image forming disc 4 along the horizontal plane. Subsequently, as a result of opening the shutter 103 after rotating the projection image forming disc 4 a predetermined angle (for example, 10 degrees) with the rotational drive unit 3, the pulsed parallel light $L_2$ and the pulsed parallel light $L_3$ simultaneously fall incident on the projection image forming disc 4. Each time the projection image forming disc 4 is rotated a predetermined angle, the incidence angle $\theta_1+\theta_2$ of the parallel light $L_2$ relative to the optical axis of the parallel light $L_3$ of the projection image forming disc 4 is varied along a horizontal plane within a predetermined range by driving the X axis stage 106 and the rotating stage 107. By repeating the foregoing process, a plurality of holograms 11, which are angle-multiplexed at a given angular interval, are recorded at the central part of the projection image forming disc 4, and these plurality of holograms 11 will be recorded in a multiplexed manner by causing the object light to change at various angles relative to its center axis $A_1$.

Figure 4:
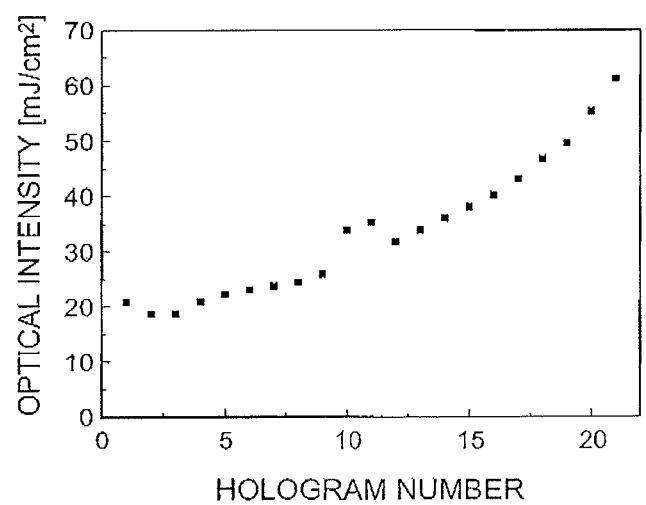
FIG. 4 is a graph showing the laser beam intensity during the recording of the hologram of FIG. 2.

FIG. 4 is a graph showing the laser beam intensity during the recording of the holograms 11. This graph shows the emission intensity of the laser beam $L_1$ of each of the plurality of holograms 11 that are angle-multiplexed. Note that the holograms 11 are recorded, for example, in a multiplexed manner at an angular interval of 15 degrees while the projection image forming disc 4 rotates 300 degrees, and, in synch therewith, the incidence angle $\theta_1$ of the parallel light $L_2$ is changed at one-degree intervals in the range of −10 degrees to +10 degrees.

Figure 5:
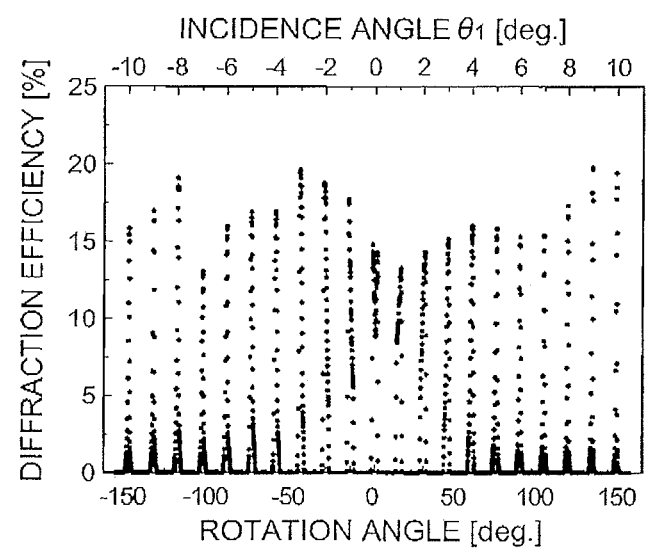
FIG. 5 is a graph showing the diffraction efficiency in the incident direction of the object light in the hologram of FIG. 2.

Moreover, FIG. 5 is a graph showing the diffraction efficiency in the incident direction of the object light in the recorded hologram 11. The diffraction efficiency is calculated by measuring the light that was transmitted through the projection image forming disc 4 by using a photodetector 111, and the position of the photodetector 111 is adjusted with the X axis stage 112 so that it can measure the intensity of the light that was transmitted in the direction of the incidence angle $\theta_1$ of the parallel light $L_2$. As is evident from this graph, the exposure is controlled so that the diffraction efficiency of the transmitted light will be uniform for the respective holograms 11, and this kind of exposure control is realized by controlling the rotation of the half wavelength plates 104, 109.

Figure 6:
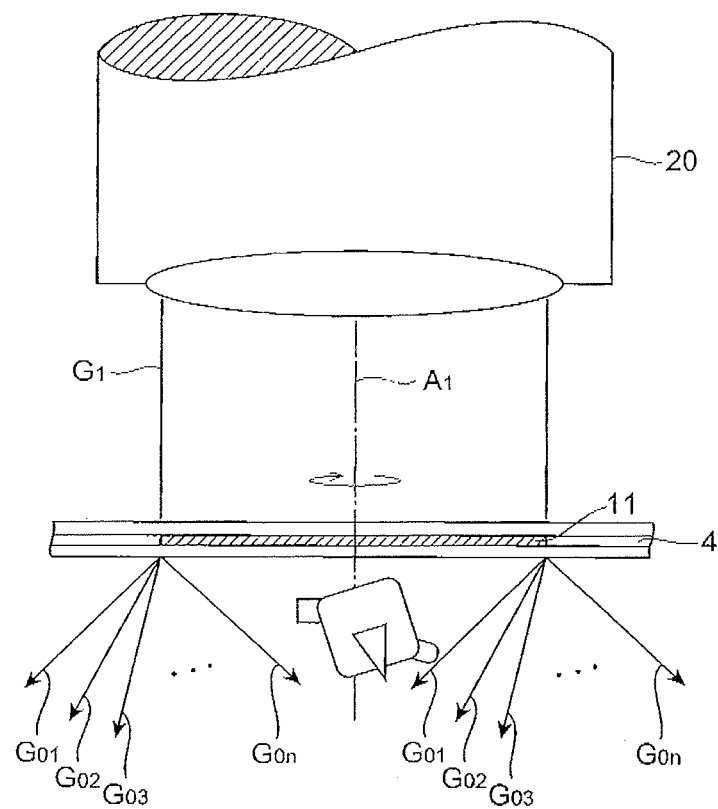
FIG. 6 is a plan view showing the projection image of the three-dimensional image based on the three-dimensional image projector of FIG. 1.

While rotationally driving the projection image forming disc 4 relative to the three-dimensional image projector 1 including the projection image forming disc 4 prepared with the method described above, pulsed image light $G_1$ having directivity falls incident from an external projector device 20 along the same axis as the optical axis of the laser beam $L_3$ during the recording of the hologram 11 (refer to FIG. 6). Consequently, the plurality of holograms 11 that were preliminarily recorded on the projection image forming disc 4 are sequentially disposed within a fixed range including the center point $C_1$ in a state of coinciding with the rotating position during the recording, and the image light $G_1$ will fall incident from the same direction as the parallel light $L_3$ during the recording of that hologram 11.

Accordingly, by causing the pulsed image light $G_1$ to fall incident in synch with the timing of disposing the plurality of holograms 11, image lights $G_{01}$, $G_{02}$, $G_{03}$, ..., $G_{0n}$ will be projected in a time series from the entire surface of the holograms 11 so that the output angle from the center axis $A_1$ along the horizontal plane will sequentially change according to the incidence angle $\theta_1$ of the parallel light $L_2$ during the recording of the respective holograms 11. In addition, if the image light $G_1$ is caused to fall incident by continuously rotating the projection image forming disc 4, the image lights $G_{01}$, $G_{02}$, $G_{03}$, ..., $G_{0n}$ can be repeatedly projected. Consequently, a predetermined three-dimensional image can be popped up at the front face of the projection image forming disc 4.

Here, the projector device 20 is a device that is able to continuously irradiate, in a pulsed manner, the image light $G_1$ to which the moving image was reflected, and, for example, a projector equipped with a digital micro mirror device manufactured by Texas Instruments is used.

According to the three-dimensional image projector 1 explained above, since only one projector device 20 is required for projecting an image in the direction that is decided based on the incidence angle $\theta_1$ of the parallel light $L_2$ during the recording of the hologram 11, it is possible to display a highly reproducible three-dimensional image even if the viewer's position is changed. In addition, it is possible to easily miniaturize the system size. Moreover, since the image is projected from the holograms 11 that were recorded in a multiplexed manner at a plurality of angles on the substrate 8a of the projection image forming disc 4 while the projecting direction is sequentially angled along the horizontal plane, it is possible to display a high resolution three-dimensional image to the viewer.

Second Embodiment

Figure 7:
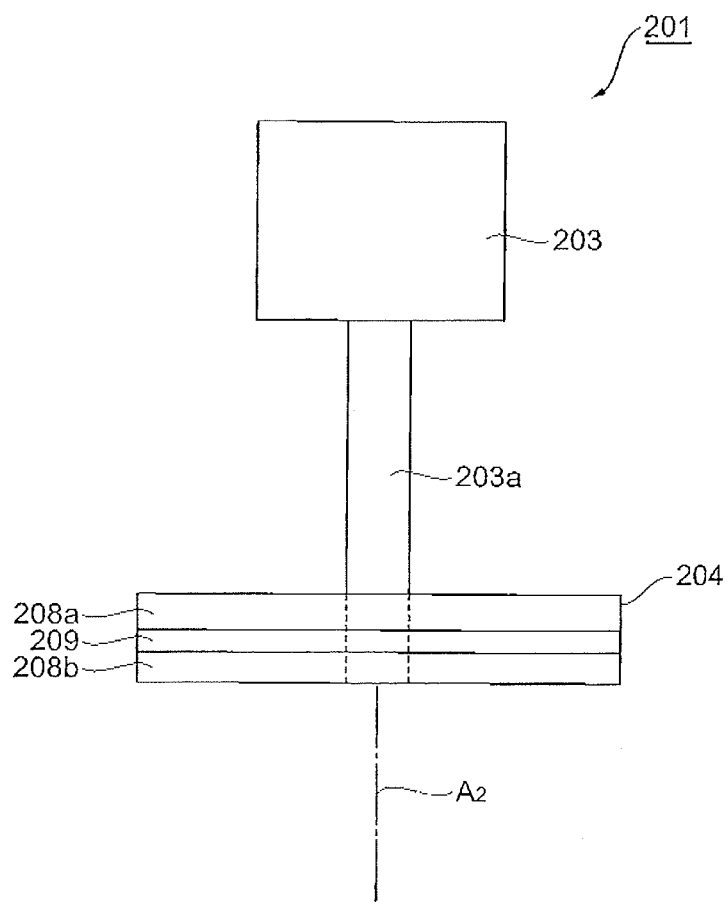
FIG. 7 is a plan view of the three-dimensional image projector according to the second embodiment of the present invention.
Figure 8:
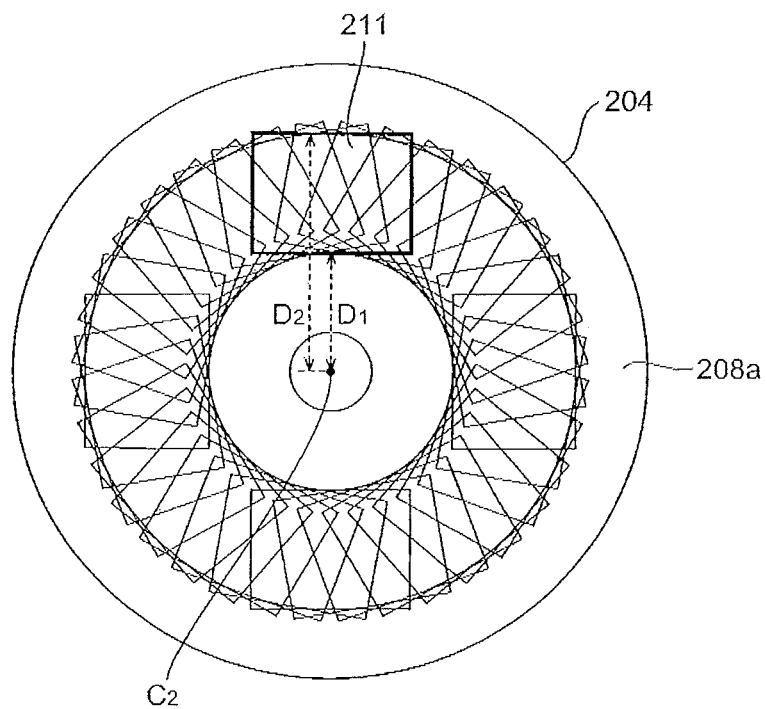
FIG. 8 is a front view of the three-dimensional image projector according to the second embodiment of the present invention.

The second embodiment of the present invention is now explained. FIG. 7 is a plan view of the three-dimensional image projector 201 according to the second embodiment of the present invention, and FIG. 8 is a front view of the three-dimensional image projector 201.

The three-dimensional image projector 201 comprises a rotational drive unit 3 including a rotation axis 203a, and a projection image forming disc 204 supported by the rotation axis 203a of the rotational drive unit 3. The projection image forming disc 204 is structured, as with the projection image forming disc 4, by a hologram recording medium 209 being bonded between two disc-shaped glass substrates 208a, 208b. Moreover, the projection image forming disc 204 is supported in a state where the rotation axis 203a penetrates the center point $C_2$ of the glass substrate 208a, and is able to rotate along the surface of the glass substrate 208a with the center point $C_2$ of the glass substrate 208a as the rotation center as a result of the rotation axis 203a being rotationally driven by the rotational drive unit 203.

With this kind of projection image forming disc 204, a plurality of rectangular holograms 211 are arranged annularly within a range at a distance of $D_1$ to $D_2$ from the center point $C_2$ on the surface of the glass substrate 8a.

These holograms 211 are prepared using a similar system as the hologram recording system 101 shown in FIG. 3. Specifically, with the hologram recording system 101, in a state where the projection image forming disc 204 is mounted on the rotational drive unit 203, the optical axis of the parallel light $L_2$, $L_3$ is positioned within a range at a upper distance of $D_1$ to $D_2$ from the center point $C_2$, and the optical axis of the parallel light $L_3$ is disposed to slant approximately at an angle $\theta_2$ relative to the surface of the glass substrate 208a. Subsequently, as a result of opening the shutter 103 after rotating the projection image forming disc 204 a predetermined angle (for example, 10 degrees) with the rotational drive unit 203, the pulsed parallel light $L_2$ and the pulsed parallel light $L_3$ simultaneously fall incident on the projection image forming disc 204. Each time the projection image forming disc 4 is rotated a predetermined angle, the incidence angle $\theta_1+\theta_2$ of the parallel light $L_2$ relative to the optical axis of the parallel light $L_3$ of the projection image forming disc 204 is varied along a horizontal plane within a predetermined range by driving the X axis stage 106 and the rotating stage 107. By repeating the foregoing process, a plurality of holograms 211, which are angle-multiplexed at a given angular interval and distance interval, are recorded along the circumference of the glass substrate 208a within the range at the distance of $D_1$ to $D_2$ from the center point $C_2$ of the projection image forming disc 204, and these plurality of holograms 211 will be recorded in a multiplexed manner by causing the object light to change at various angles relative to its center axis $A_2$.

When the pulsed image light $G_1$ having directivity falls incident from the projector device 20 within the range at the distance of $D_1$ to $D_2$ from the center point $C_2$ along the same axis as the optical axis of the laser beam $L_3$ during the recording of the hologram 211 while rotationally driving the projection image forming disc 204 relative to the three-dimensional image projector 201, the plurality of holograms 211 will be sequentially disposed within a fixed range of the distance $D_1$ to $D_2$ outside of the center point $C_2$ in a state of coinciding with the rotating position during the recording. Consequently, the image light $G_1$ will fall incident from the same direction as the parallel light $L_3$ during the recording of the hologram 211. Accordingly, by causing the pulsed image light $G_1$ to fall incident in synch with the timing of disposing the plurality of holograms 211, a predetermined three-dimensional image can be popped up at the front face of the projection image forming disc 4.

The three-dimensional image projector 201 explained above is also able to display a high resolution three-dimensional image to a viewer. Moreover, since the holograms 211 are not disposed at the rotation center $C_2$, the projection image forming disc 204 can be rotated by using the rotation axis, and the configuration of the rotation mechanism can be simplified.

Figure 9:
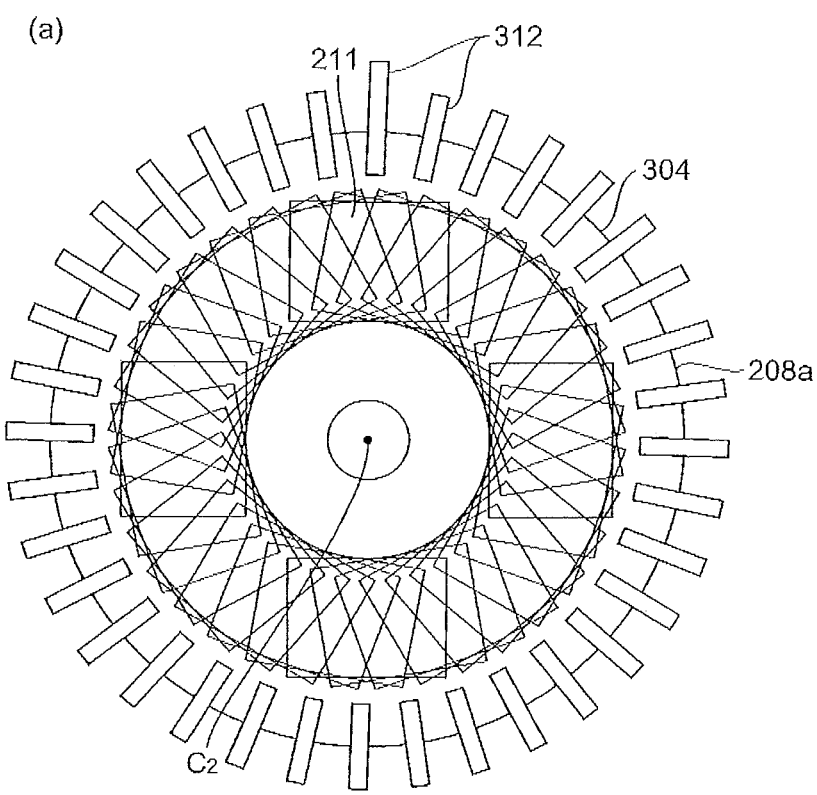
FIG. 9 is a plan view and a side view of the projection image forming disc according to a modified example of the present invention.
Figure 9:
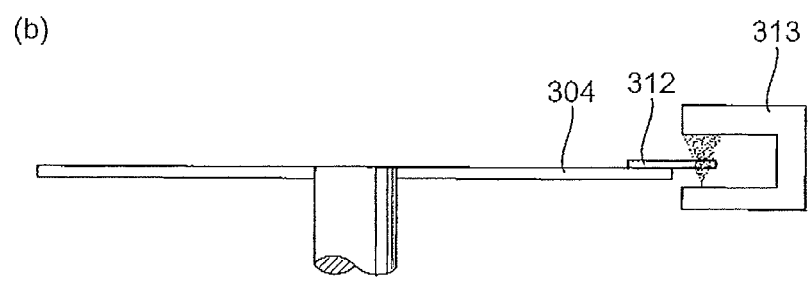

The present invention is not limited to the embodiments described above. For example, as shown with the projection image forming disc 304 as a modified example of the present invention shown in FIG. 9(a) and FIG. 9(b), a plurality of markers 312 may be mounted annularly at positions separated a predetermined distance from the center point $C_2$ on the surface of the glass substrate 208a, and a photo interrupter (detection unit) 313 may be provided to a position corresponding to each of the markers 312. By arranging these markers 312 at predetermined intervals in correspondence with the multiplexed arrangement of the holograms 211 and detecting the passage of the markers 312 with the photo interrupter 313 during the rotational drive of the projection image forming disc 304, the rotation angle of the projection image forming disc 304 can be recognized. Consequently, by controlling the irradiation timing of the image light based on the projector device 20 by using the detection signal of the photo interrupter 313, the flickering and imperfect synchronization of the projected three-dimensional image can be decreased with certainty.

Figure 10:
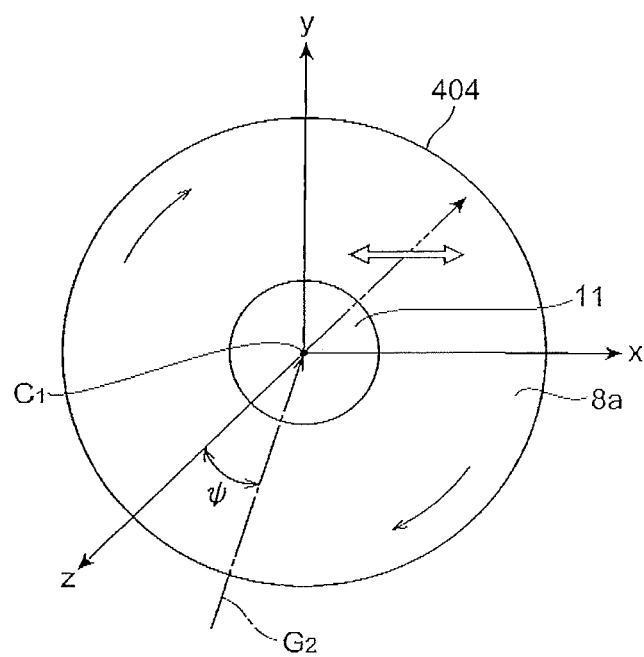
FIG. 10 is a diagram showing the incident direction of the image light relative to the projection image forming disc according to another modified example of the present invention.

In addition, the holograms to be prepared on the projection image forming disc do not necessarily have to be multiplexed. For example, as with the projection image forming disc 404 as a modified example of the present invention shown in FIG. 10, a hologram 11, which was exposed once by causing the parallel light $L_2$ to fall incident at a predetermined incidence angle $\theta_1$, to be preliminarily created at a position including the center point $C_1$ on the surface of the glass substrate 8a. In FIG. 10, the Z axis is taken along the center axis of the projection image forming disc 404, and the X axis and the Y axis are taken in the horizontal direction and the vertical direction along the surface of the glass substrate 8a, and shows a case where the hologram 11 is prepared where the incidence angle $\theta_1$ of the parallel light $L_2$ is 0 degrees. When causing the image light to fall incident on this kind of projection image forming disc 404, the image light is irradiated within a fixed range including the center point $C_1$ on the glass substrate 8a in a direction that is slanted in the +Y axis direction at a predetermined angle $\Psi$ relative to the $-Z$ axis direction as the incident direction of the parallel light $L_3$ during exposure. This kind of projection image forming disc 404 is also able to display a three-dimensional image with minimal flickering since the projecting direction of the image shifts horizontally along the XZ plane upon causing the image light to continuously fall incident on one hologram 11 on the glass substrate 8a while rotating the projection image forming disc 404. Moreover, multiplexed recording of the hologram 404 prepared as described above may be performed by rotating the disc. Here, since the image light $G_{O1}$ to $G_{On}$ is projected a plurality of times while the disc rotates once upon causing the image light to fall incident on the projection image forming disc 404 from the foregoing direction (FIG. 6), the rotating speed of the disc can be lowered, and the configuration of the device can be simplified even further.

In addition, the hologram to be formed on the projection image forming disc is not limited to a transmission type, and a reflection-type hologram may also be used.

Furthermore, the material configuring the projection image forming disc is not limited to glass, and a resin material such as plastic may also be used, or it may be configured only from a hologram recording material.

Preferably, the projection image formation unit is preliminarily recorded with a plurality of holograms in a multiplexed manner while changing an incident direction of the object light on the hologram recording medium, and the drive unit is configured to rotationally drive the projection image formation unit so that the plurality of holograms are sequentially arranged within a predetermined fixed range on the substrate. Here, since the image is projected from the plurality of multiplexed holograms while sequentially changing the projecting direction by causing the image light to fall incident within a predetermined fixed range while rotating the projection image formation unit, the device for displaying the three-dimensional image can be easily miniaturized.

Moreover, preferably, the projection image formation unit is preliminarily recorded with the plurality of holograms in a multiplexed manner by rotationally driving the projection image formation unit with the predetermined point as the rotation center and simultaneously causing the object light to fall incident on the fixed range including the predetermined point while the incident direction of the object light is angled along a surface that is perpendicular to the surface of the substrate. If the foregoing projection image formation unit is provided, the image will be projected from the holograms that are multiplexed at a plurality of angles on the substrate while the projecting direction is sequentially angled along a surface that is perpendicular to the surface of the substrate. Thus, it is possible to display a high resolution three-dimensional image to the viewer.

In addition, preferably, the projection image formation unit is preliminarily recorded with the plurality of holograms in a multiplexed manner by rotationally driving the projection image formation unit with the predetermined point as the rotation center and simultaneously causing the object light to fall incident on the outer fixed range outside the rotation center on the substrate while the incident direction of the object light is angled along a surface that is perpendicular to the surface of the substrate. If the foregoing projection image formation unit is provided, the image will be projected from the holograms that are multiplexed at a plurality of angles and positions on the substrate while the projecting direction is sequentially angled along a surface that is perpendicular to the surface of the substrate. Thus, it is possible to display a high resolution three-dimensional image to the viewer. Further, since the holograms are not disposed at the rotation center, the configuration of the rotation mechanism can be simplified.

In addition, preferably, the image light falls incident toward a fixed range on the substrate obliquely to the surface of the substrate while the projection image formation unit is rotationally driven by the drive unit. If the foregoing configuration is adopted, it is possible to display a three-dimensional image with minimal flickering since the projecting direction of the image is shifted along a surface that is perpendicular to the surface of the substrate upon causing the image light to continuously fall incident on one hologram on the substrate of the projection image formation unit.

Furthermore, preferably, a plurality of markers disposed annularly at positions separated a predetermined distance from the rotation center on the substrate of the projection image formation unit, and a detection unit that is provided to a position corresponding to each of the plurality of markers on the substrate and detects a rotation angle of the projection image formation unit by detecting passage of the plurality of markers are additionally provided. Consequently, the flickering of the image can be reduced with certainty since the image light can be caused to fall incident in accordance with the position of the hologram on the substrate by detecting the rotation angle of the projection image formation unit.

INDUSTRIAL APPLICABILITY

The present invention employs a three-dimensional image projector for projecting a three-dimensional image by causing image light having directivity to fall incident from outside, and is able to display a highly reproducible three-dimensional image in response to changes in the viewer's position and easily realize the miniaturization of the system.

REFERENCE SIGNS LIST 1, 201 . . . three-dimensional image projector, 3, 203 . . . rotational drive unit, 4, 204, 304, 404 . . . projection image forming disc, 8$a$, 208$a$ . . . glass substrate, 9, 209 . . . hologram recording medium, 11, 211 . . . hologram, 312 . . . marker, 313 . . . photo interrupter, $C_1$, $C_2$ . . . center point, $G_1$ . . . image light, $L_2$ . . . parallel light (object light), $L_3$ . . . parallel light (reference light)

The invention claimed is:

1. A three-dimensional image projector, comprising:
 a projection image formation unit in which a hologram recording medium is formed along a tabular substrate, and which projects image light having directivity by causing the image light to fall incident on the hologram recording medium; and
 a drive unit for rotationally driving the projection image formation unit along a surface of the substrate with a predetermined point on the surface as a rotation center;
 wherein the projection image formation unit is preliminarily recorded with a hologram by causing two laser beams as reference light and object light to simultaneously fall incident on the hologram recording medium; and
 wherein the projection image formation unit is preliminarily recorded with a plurality of holograms in a multiplexed manner while changing an incident direction of the object light on the hologram recording medium, and the drive unit is configured to rotationally drive the projection image formation unit so that the plurality of holograms are sequentially arranged within a predetermined fixed range on the substrate.

2. The three-dimensional image projector according to claim 1, wherein the projection image formation unit is preliminarily recorded with the plurality of holograms in a multiplexed manner by rotationally driving the projection image formation unit with the predetermined point as the rotation center and simultaneously causing the object light to fall incident on the fixed range including the predetermined point while the incident direction of the object light is angled along a surface that is perpendicular to the surface of the substrate.

3. The three-dimensional image projector according to claim 1, wherein the projection image formation unit is preliminarily recorded with the plurality of holograms in a multiplexed manner by rotationally driving the projection image formation unit with the predetermined point as the rotation center and simultaneously causing the object light to fall incident on the outer fixed range outside the rotation center on the substrate while the incident direction of the object light is angled along a surface that is perpendicular to the surface of the substrate.

4. The three-dimensional image projector according to claim 1, wherein the image light falls incident toward a fixed range on the substrate obliquely to the surface of the substrate while the projection image formation unit is rotationally driven by the drive unit.

5. The three-dimensional image projector according to claim 1, further comprising: a plurality of markers disposed annularly at positions separated a predetermined distance from the rotation center on the substrate of the projection image formation unit; and a detection unit that is provided to a position corresponding to each of the plurality of markers on the substrate and detects a rotation angle of the projection image formation unit by detecting passage of the plurality of markers.

* * * * *